United States Patent [19]
Maurer

[11] Patent Number: 5,314,381
[45] Date of Patent: May 24, 1994

[54] DETENT ARRANGEMENT FOR THE COUPLING PIN OF AN OVERLOAD ELEMENT, PARTICULARLY IN AN OVERLOAD CLUTCH

[75] Inventor: Ruprecht Maurer, Bad Homburg vor der Höhe, Fed. Rep. of Germany

[73] Assignee: Ringspann GmbH, Bad Homburg, Fed. Rep. of Germany

[21] Appl. No.: 932,383

[22] Filed: Aug. 19, 1992

[30] Foreign Application Priority Data

Sep. 27, 1991 [DE] Fed. Rep. of Germany ....... 4132193
Oct. 23, 1991 [DE] Fed. Rep. of Germany ....... 4134919

[51] Int. Cl.$^5$ ............................................. F16D 7/02
[52] U.S. Cl. ...................................... 464/30; 464/36; 192/56 R
[58] Field of Search ........................ 464/30, 36, 37, 38, 464/40, 41, 43, 44; 192/56 R, 150

[56] References Cited

U.S. PATENT DOCUMENTS

| | | | |
|---|---|---|---|
| 3,080,029 | 3/1963 | Stober | 192/56 R |
| 4,199,964 | 4/1980 | Grey | 464/38 X |
| 4,371,354 | 2/1983 | McKean | 464/36 |
| 4,599,019 | 7/1986 | Ueberall | 192/56 R X |
| 4,637,502 | 1/1987 | Mayr et al. | 192/56 R |
| 4,660,247 | 4/1987 | Frohbieter et al. | 192/56 R X |
| 4,744,447 | 5/1988 | Kato et al. | 464/30 X |
| 4,798,559 | 1/1989 | Maurer et al. | 464/38 |
| 4,838,829 | 6/1989 | Maurer et al. | 464/38 |
| 4,896,755 | 1/1990 | Girguis | 464/36 X |
| 5,005,684 | 4/1991 | Fujii | 464/36 X |
| 5,201,374 | 4/1993 | Rahm | 192/56 R X |

FOREIGN PATENT DOCUMENTS

| | | |
|---|---|---|
| 0156993B1 | 11/1986 | European Pat. Off. . |
| 37202301A1 | 7/1988 | Fed. Rep. of Germany . |
| 3602282C3 | 7/1990 | Fed. Rep. of Germany . |
| 1202595 | 1/1960 | France ................................. 464/36 |

*Primary Examiner*—Clifford D. Crowder
*Assistant Examiner*—John J. Calvert
*Attorney, Agent, or Firm*—Spencer, Frank & Schneider

[57] ABSTRACT

A detent arrangement is disclosed for the coupling pin of an overload element, particularly in an overload clutch, wherein a coupling pin is in form-locking engagement with the oppositely disposed clutch half, with such engagement being released when there is an overload; at its rear end, the pin is provided with the detent arrangement. This detent arrangement surrounds the rear pin end with a spring arrangement which is partially supported at the housing that accommodates it and otherwise at a collar of the coupling pin, with one end of the spring arrangement being supported by means of a slide ring and a plurality of locking elements that extend toward a cone envelope face of the coupling pin and a contact face of the housing. In this connection it is provided that, in the direction toward the opposite clutch half, the spring arrangement is supported by a radial shoulder of the coupling pin and the rear end of the coupling pin is provided with a cone envelope face for the locking elements with this cone envelope face extending radially outwardly away from the other clutch half. The locking elements are supported by the contact face in such a way that, if the coupling pin escapes due to an overload, the locking elements can be displaced in the direction toward the pin axis.

17 Claims, 9 Drawing Sheets

DETENT ARRANGEMENT FOR THE COUPLING PIN OF AN OVERLOAD ELEMENT, PARTICULARLY IN AN OVERLOAD CLUTCH

CROSS REFERENCE TO RELATED APPLICATION

This application claims the priority of Applications Ser. Nos. P 41 32 193.6, filed Sep. 27, 1991, and P 41 34 919.9, filed Oct. 23, 1991, both in the Federal Republic of Germany, the subject matter of which is incorporated herein by reference.

BACKGROUND OF THE INVENTION

The present invention relates to a detent arrangement for locking and, in the case of an overload, unlocking the coupling pin of an overload element, particularly in an overload clutch, with the front end of a coupling pin that is displaceably arranged in one clutch half being in form-locking engagement with the other clutch half. In the case of an overload, this engagement is released by the axial displacement of the coupling pin which causes it to move away from the other clutch half. The rear end of the coupling pin is disposed in a housing in the one clutch half and is there provided with a detent arrangement which encloses the rear pin end with a spring arrangement whose end facing away from the other clutch half, on the one hand, is at least partially supported by the housing and, on the other hand, is supported at a collar of the coupling pin. One end of the spring arrangement is supported by way of a slide ring by a plurality of locking elements that are distributed around the circumference of the coupling pin and are captured between the slide ring, a cone envelope face of the coupling pin and an essentially radially oriented contact face of the housing.

Such detent arrangements are disclosed in European Patent No. 0,156,993 (which corresponds to U.S. Pat. No. 4,637,502), German Patent No. 3,602,282 (which corresponds to U.S. Pat. Nos. 4,798,559 and 4,838,829) as well as Unexamined Published German Patent Application DE-OS 3,720,301.

The coupling pin is here provided with a cone envelope face as support for the locking elements that are disposed on the side of the spring arrangement facing the other clutch half. With respect to the coupling pin, this cone envelope face extends radially outwardly toward the other clutch half. This type of structure produces the result that, if the coupling pin is displaced due to an overload, the locking elements are squeezed radially outwardly against the force of the spring arrangement until the coupling pin is able to pass within and through the then outwardly displaced locking elements with a movement that is directed away from the other clutch half. Thus a relatively large, so-called disengagement angle between the two clutch halves is connected with the prior art structure, that is, a rotation angle which lies between the coupling pin in the overload state and its engagement in the other clutch half, on the one hand, and the reaction in the sense of disengaging the clutch after the appropriate axial displacement of the coupling pin. That means that, in the prior art case, the clutch reacts only relatively slowly to the overload state in the sense of disengagement, with the friction forces generated with increasing load on the spring packet and acting between the locking elements and their contact at the slide ring, at the cone envelope face of the coupling pin and at the housing support playing a part here, in particular.

SUMMARY OF THE INVENTION

It is an object of the present invention to modify, or change, a detent arrangement of the above-mentioned type in such a way that it permits a reduction of the disengagement angle and thus also a reduction of the difference between the moment of response and the moment of disengagement of a clutch. This is to become possible without the requirement of additional space within the scope of the means provided by the above-mentioned prior art.

The problem on which the present invention is based, is solved by the present invention with a detent arrangement of the above-mentioned type in which the spring arrangement is supported in the direction toward the other clutch half by a radial shoulder of the coupling pin; the rear end of the coupling pin is provided with a radially outwardly extending cone envelope face for the locking elements, with this cone envelope face being oriented away from the other clutch half; the locking elements are supported on the contact face oriented toward the other clutch half in such a way that, if the coupling pin escapes due to an overload, the locking elements can be displaced in the direction toward the pin axis; and, in their position displaced toward the pin axis, the locking elements can be displaced parallel to the coupling pin within a housing bore surrounding the coupling pin beyond the contact face and away from the other clutch half.

With these measures according to the invention the configuration of the detent arrangement has been changed in such a way that now, during disengagement of the clutch, the cone envelope face of the coupling pin is taken away from its contact with the locking elements so that, under the force of the spring packet, the locking elements are displaced radially inwardly toward the coupling pin and then axially within the bore together with the coupling pin. This results in a stress relief for the locking elements in the course of the disengagement process and their release in the sense of the above-described movement so that the disengagement process results in only a slight, temporary increase of the pressure forces at the locking elements. The result is a comparatively great reduction of the disengagement angle and the moment of response of the detent arrangement in the sense of a disengagement of the clutch without it requiring a comparable change—except for the structural configuration—in the number and type of elements employed.

The structure according to the invention is connected with the further advantage that now the locking elements are in the locking position on a comparatively greater circumference and move from there, for the purpose of unlocking, into a position on a smaller circumference thus improving the stressability and load-carrying capability and additionally their resistance against wear compared to the prior art arrangement in which the locking elements experience their actual supporting load on a smaller circumference from which they are then shifted to a larger circumference for unlocking.

According to the invention, various advisable structural configurations result.

For example, it may be provided that, in the locking position of the detent arrangement, the locking elements are in contact with a radially oriented annular face of the slide ring and with a cone envelope face of the housing, the latter being sloped in a direction opposite to the cone envelope face of the coupling pin.

However it is also possible that, if the detent arrangement is in the locking position, the locking elements, on the one hand, are in contact with a cone envelope face of the slide ring, with this cone envelope face being sloped in a direction opposite to the cone envelope face of the coupling pin and, on the other hand, with a cone envelope face of the housing, with this cone envelope face likewise being sloped in a direction opposite to the cone envelope face of the coupling pin. The slope of the cone envelope face of the slide ring relative to the slope of the cone envelope face of the coupling pin is less than the slope of the cone envelope face of the housing relative to the cone envelope face of the coupling pin.

Another possibility is that, if the detent arrangement is in the locking position, the locking elements are in contact with a radial contact face of the housing and with a cone envelope face of the slide ring, with these cone envelope faces being sloped in the same direction as the cone envelope face of the coupling pin but enclosing a larger angle relative to the axis of the coupling pin than the cone envelope face of the coupling pin.

Finally, it is also possible that, if the detent arrangement is in the locking position, the locking elements are in contact, on the one hand, with a cone envelope face of the housing that is sloped oppositely to the cone envelope face of the coupling pin and, on the other hand, with a cone envelope face of the slide ring which is sloped in the same sense as the cone envelope face of the coupling pin but encloses a larger angle relative to the axis of the coupling pin than the cone envelope face of the coupling pin.

In all cases that may appear expedient for structural reasons depending on the requirements of each individual case, it is ensured that, during an escape movement of the cone envelope face of the coupling pin due to an overload, the locking elements are moved radially in the direction toward the coupling pin by a wedge effect created by the spring arrangement to then continue traveling together with the coupling pin within the bore inside the contact face.

Regarding the configuration of the locking elements, in the simplest case, they may be a plurality of balls that are distributed over the circumference of the coupling pin. Particularly for cases involving greater loads, however, it may be advisable to provide the locking elements in the form of ring segments that have a polygonal cross section and are distributed over the circumference of the coupling pin, with their pressure receiving side faces being parallel to the contact faces of the slide ring, the coupling pin and the housing. In the engaged case, these ring segments, must of course be arranged so as to be distributed over the circumference of the coupling pin at such intervals that they do not interfere with one another during the displacement to a smaller diameter which results when the detent arrangement is unlocked.

Particularly with the use of locking elements in the form of ring segments having a polygonal cross section, a structural configuration is advisable in which the contact face of the housing is oriented radially relative to the pin axis since then no change in the basically planar and flat arrangement of the pairs of locking elements relative to the contact face results for the locking elements in the course of the unlocking process as this would be the case if, with locking elements in the form of circle segments having a polygonal cross section, the contact face at the housing were configured as a cone envelope face.

As a further structural feature of the invention, it may be provided that the housing is configured as a housing member that can be screwed to the one clutch half thus considerably facilitating installation.

It may further be provided in this connection that the cone envelope face of the coupling pin is formed by a pin cap which is placed and screwed onto the end of the coupling pin facing away from the other clutch half. This results, in particular, in the possibility of pre-tensioning the spring arrangement during installation by way of the central screw for the cap, which is accomplished with only a relatively small tightening moment.

Combining the two above-mentioned structural details may further make it advisable to have the pin cap grip behind the slide ring on its side facing the other clutch half by means of a releasable radial web in the form of a spring ring or the like and to provide the other end of the pin cap which faces away from the other clutch half with a likewise releasable radial web that is in engagement with a recess at the end of the bore that accommodates the pin cap in the housing member, with the recess widening the bore at that end.

With this structural configuration, pin cap, locking elements, slide ring and housing member are combined into a captive unit which can easily be unscrewed or removed as a whole in order to make the spring arrangement accessible for adjustments within the spring arrangement with respect to changing the overload moment of the detent arrangement. It is then also possible in a particularly simple manner to insert shims between the slide ring and the spring arrangement or between the spring arrangement and the shoulder of the coupling pin order to control the strength of the spring arrangement in a particularly sensitive manner.

Finally, particularly if, for re-engagement, the coupling pins are to be charged at their ends facing away from the second clutch half by means of a cylinder piston assembly or the like, so that a closed structural unit is formed at that end, it is advisable to configure the coupling pin in two parts in such a way that the pin shaft which accommodates the spring arrangement is releasably connected by means of screws or the like with the part of the pin facing the other clutch half and forming a shoulder at the end. In case a change is to be made in the strength of the spring arrangement, it is then possible to release the two parts of the pin from one another, in other words, the pin member forming the shoulder at its end can be unscrewed so that the end of the spring arrangement becomes accessible and either a change can be made at the spring itself, which is usually composed of a packet of disk springs or to make a fine adjustment at the shims disposed on this side.

BRIEF DESCRIPTION OF THE DRAWINGS

Further features and details of the present invention will become evident from the description below of embodiments thereof that are illustrated in the drawings in which.

DETAILED DESCRIPTION OF THE PREFERRED EMBODIMENTS

Figure 1:
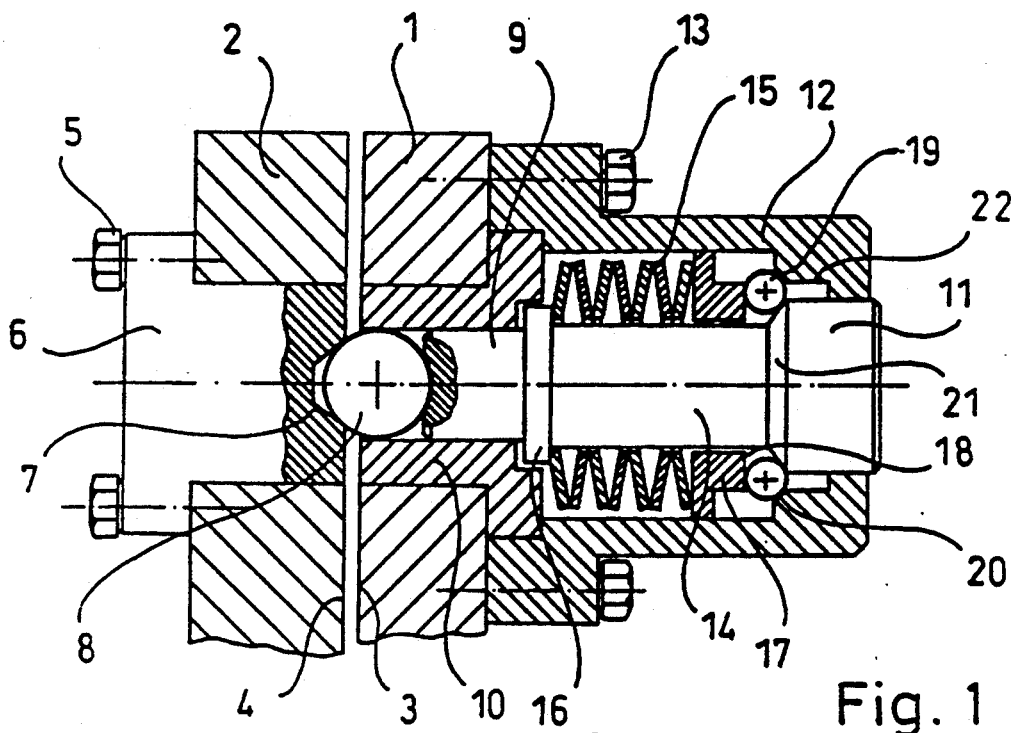
FIGS. 1 and 2 depict a first embodiment of a detent arrangement according to the invention in the engaged state and in the disengaged state.

FIG. 1 is a partial axial sectional view of an overload clutch including a clutch half 1 and a clutch half 2 which are coaxial with one another and rotatable but not axially displaceable.

The end faces 3 and 4 of clutch halves 1 and 2 face one another. Clutch half 2 is provided with inserts 6 that are inserted into and distributed uniformly over its circumference, are fastened by means of screws 5 and are provided with indentations 7 that face clutch half 1. If the clutch is engaged, a ball 8 carried by clutch half 1 engages in each indentation 7 and thus comes in contact with the sides of indentation 7.

Ball 8 is disposed at the end of a coupling pin 9 where it faces clutch half 2. Pin 9 is mounted so as to be displaceable within clutch half 1 parallel to the clutch axis within an insert 10. The rear end of the pin is provided with a thickened portion 11 that is mounted so as to be displaceable in a housing 12 that is coaxial with pin 9 and is flanged to clutch half 1 by means of screws 13.

The shaft 14 of pin 9 is surrounded by a spring arrangement 15 composed of disk springs that are supported, on the side facing clutch half 2, by a collar 16 of pin 9 and on the opposite side by a slide ring 17 that is mounted on the shaft 14 of pin 9 so as to be axially displaceable and is also axially displaceably mounted within the bore of housing 12.

The forces from spring arrangement 15 transferred by way of slide ring 17 move by means of a radial face 18 of slide ring 17 to balls 19 a plurality of which are arranged uniformly over the circumference of pin 9. Balls 19 are supported, on the one hand, by a cone envelope face 20 of housing 12 and, on the other hand, by a cone envelope face 21 of pin 9 which is formed on the pin between shaft 14 and thickened portion 11. Cone envelope face 21 is directed radially outwardly away from clutch half 2 while the cone envelope face 20 of housing 12 is configured to be oriented oppositely to cone envelope face 21.

This arrangement has the effect that, with the clutch engaged, as shown in FIG. 1, the force of spring arrangement 15 by way of collar 16 pushes pin 9 in the direction of clutch half 2 and holds it there so that ball 8 is in engagement with indentation 7 and thus formlockingly connects the two clutch halves 1 and 2 with one another.

If the clutch experiences an overload, ball 8 is pushed out of indentation 7 due to the relative rotation of clutch halves 1 and 2 against one another which at the same time results in a movement of coupling pin 9 from the left to the right with respect to FIG. 1. Thus cone envelope face 21 also escapes to the right so that balls 19 are no longer able to be in contact and supported there. Consequently the force of spring arrangement 15 causes the balls to travel along cone envelope face 20 radially inwardly toward the exterior face of the shaft 14 of coupling pin 9 until they get away from cone envelope face 20 and are able to continue their travel to the right together with pin 9 in a subsequent axial bore 22.

Figure 2:
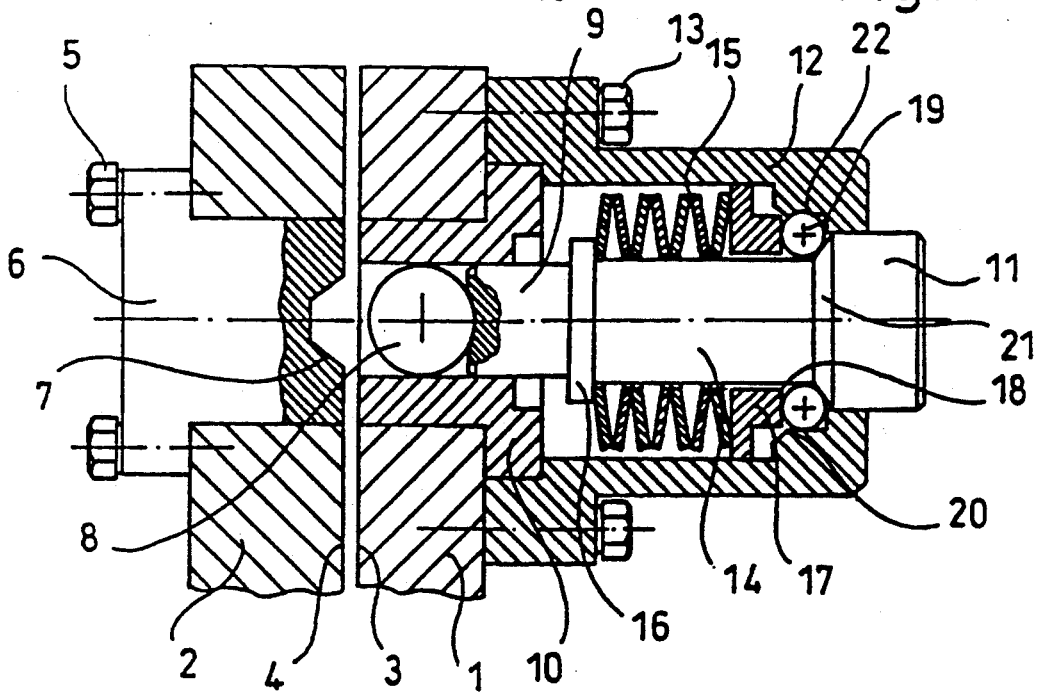

This thus reached end state is shown in FIG. 2. It shows coupling pin 9 in its extreme right position with respect to FIG. 2 which corresponds to the unlocked position in which spring arrangement 15 is practically relaxed and ball 8 is disposed entirely within clutch half 1. The described arrangement and its mode of operation practically ensures that ball 8 will be unable, during disengagement of the clutch, to strike back once more and thus cause damage to clutch half 2.

As can be seen, in the present case, the unlocking of the detent arrangement shown as a whole takes place for ball 8 in that balls 19 are relieved by the removal of cone envelope face 21 so that they are able to travel into the bore 22 of housing 12 practically without effort, without thus involving any significant change in the pre-tensioning force of spring arrangement 15. Thus the displacement of coupling pin 9 away from clutch half 2 due to the clutching force as predetermined by spring arrangement 15 between ball 8 and indentation 7 being exceeded, causes pin 9 in housing 12 to be unlocked very quickly and without significant further increase in the force exerted between ball 8 and its contact at the wall of indentation 7.

Figure 3:
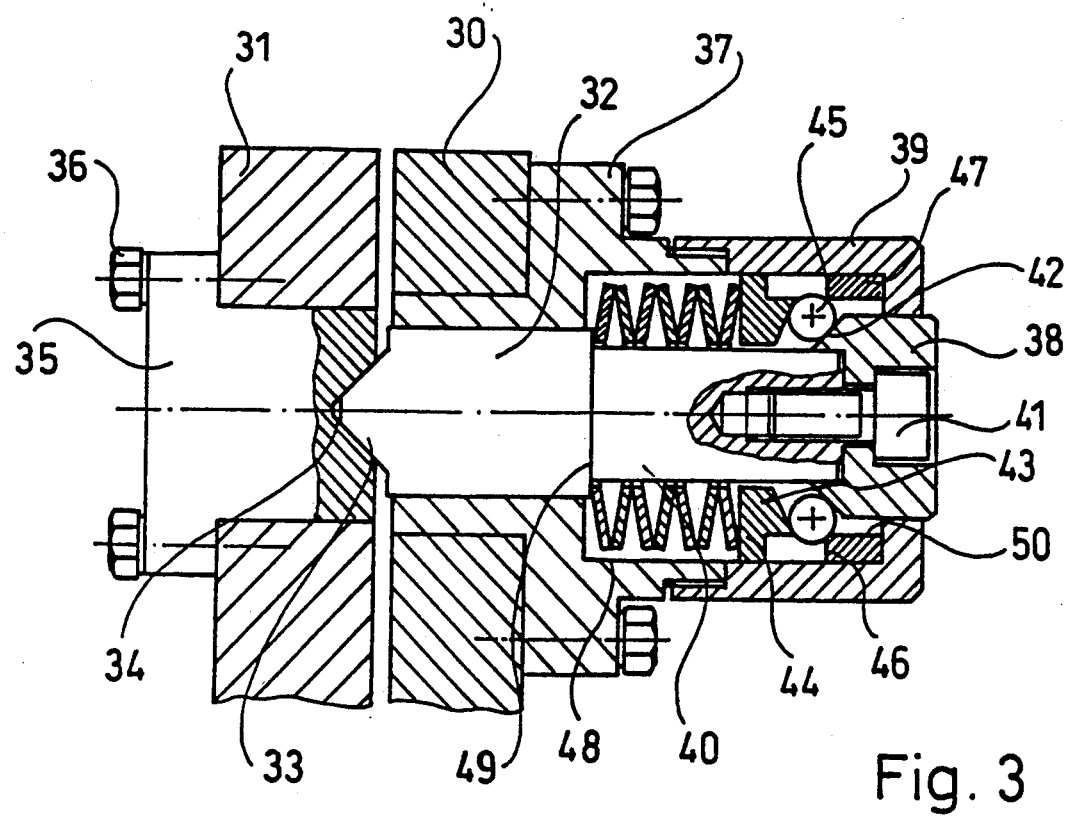
FIGS. 3 and 4 depict a second embodiment of the detent arrangement in the engaged state and in the disengaged state.
Figure 4:
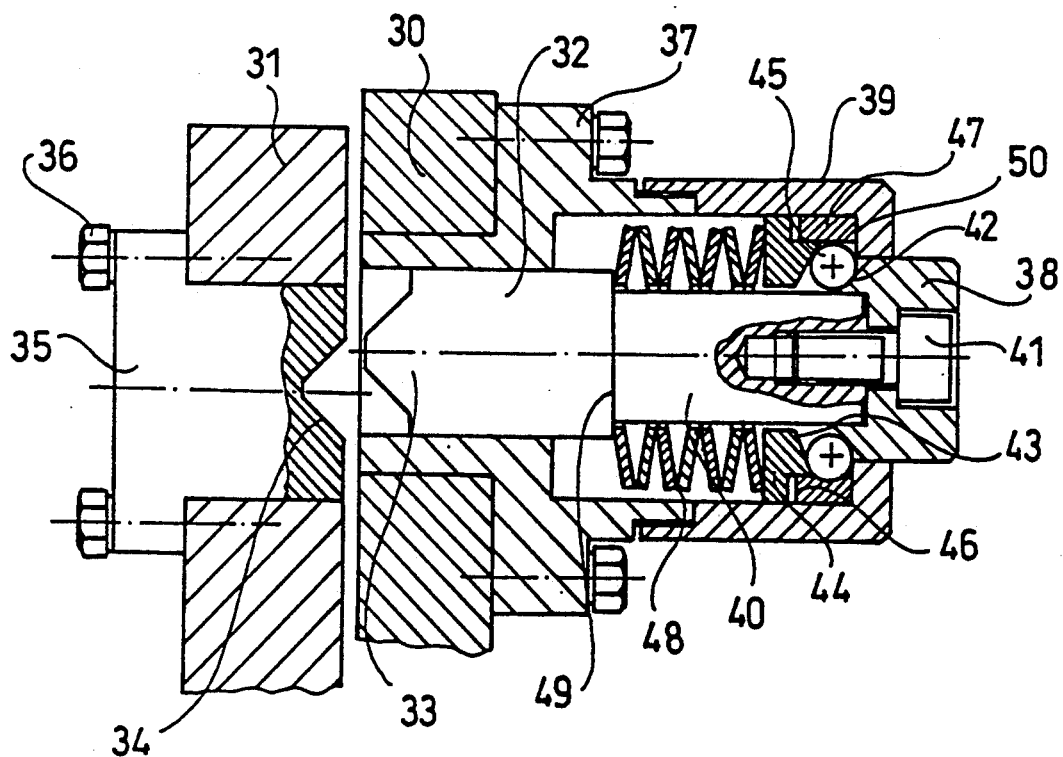

FIGS. 3 and 4 show the subject matter of FIGS. 1 and 2 in a somewhat modified form. Here again clutch halves 30 and 31 are provided, with, however, coupling pin 32 being provided with a tooth-shaped cutting edge 33 at its front end facing clutch half 31. When the clutch is engaged, this cutting edge enters into a corresponding tooth gap 34 formed by the insert 35 in clutch half 31 where clutch half 31 is fastened by means of screws 36.

The end of coupling pin 32 facing clutch half 31 is displaceable in a housing member 37 and its rear end 38, which forms a thickened portion, is displaceable in a housing member 39 that has been screwed onto housing member 37. The rear, thickened end 38 of coupling pin 32 is configured as a pin cap which is placed onto the shaft 40 of coupling pin 32 by means of a screw 41.

At its end facing clutch half 31, pin cap 38 again forms the cone envelope face 42 already discussed in connection with FIGS. 1 and 2 which faces the cone envelope face 43 of a slide ring 44. This cone face is oriented in the same direction but encloses a larger angle relative to the pin axis. Balls 45 which are uniformly distributed over the circumference of coupling pin 32 are inserted between these cone envelope faces and are supported thirdly by a radial face 46 of a hardened ring 47 that has been inserted into housing member 39.

The shaft 40 of coupling pin 32 is again surrounded by a spring arrangement 48 of disk springs which are supported on the side facing away from slide ring 44 by a collar 49 of coupling pin 32.

The mode of operation of this detent device is the same as that described in connection with FIGS. 1 and 2. If there is an overload on the clutch formed by clutch halves 30 and 31, tooth 33 is pushed out of tooth gap 34 and thus coupling pin 32 is moved from the left to the right with respect to FIG. 3, thus causing cone envelope face 42 to release balls 45 and enabling them to travel inwardly along the radial face 46 of ring 47 in the direction toward the shaft 40 of pin 32 until they are able to travel together with pin 32 from the left to the right with respect to FIG. 3 in a bore 50 formed by ring 47. This radially inward movement of balls 45 is effected by the cone envelope face 43 of slide ring 44 against the force of spring arrangement 48.

The disengaged state of this detent arrangement ultimately resulting from the above is shown in FIG. 4.

Regarding FIGS. 1 to 4 it can be stated summarily that a re-engagement of the detent arrangement is effected in that coupling pins 9 and 32, respectively, can be re-engaged by external action on its end facing away from clutch half 2 and 31, respectively, so that ball 8 is able to enter into indentation 7 or tooth 33 into tooth gap 34, respectively.

FIGS. 5 to 10 show a configuration that is comparable to FIGS. 3 and 4, with the reference numerals of FIGS. 3 and 4 being used again, for the sake of simplicity, for the subject matter of FIGS. 5 to 10. The only difference is that the locking elements formed in FIGS. 3 and 4 by balls 45 are now formed by ring segments 51 that are distributed over the circumference of coupling pin 32. These ring segments have a polygonal cross section such that they are substantially in areal contact with the cone envelope face 42 of pin cap 38, the cone envelope face 43 of slide ring 44 and the radial contact face 46 of ring 47.

Figure 6:
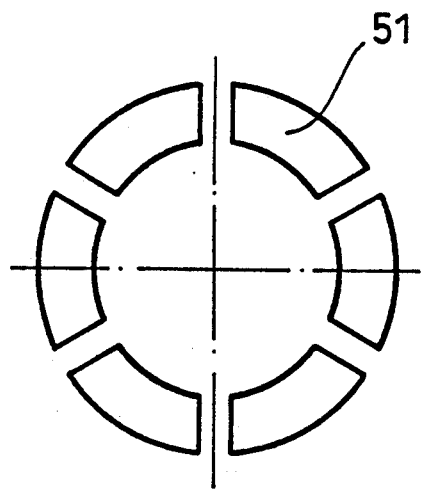

In this connection, FIG. 6 shows how the ring segments are arranged over the circumference of coupling pin 32 when the detent arrangement is in the locking position. Here it can be seen that the ring segments are noticeably spaced from one another in the circumferential direction so that, when the detent arrangement is unlocked, that is, when they move radially in the direction toward the pin axis, they do not interfere with one another.

Figure 5:
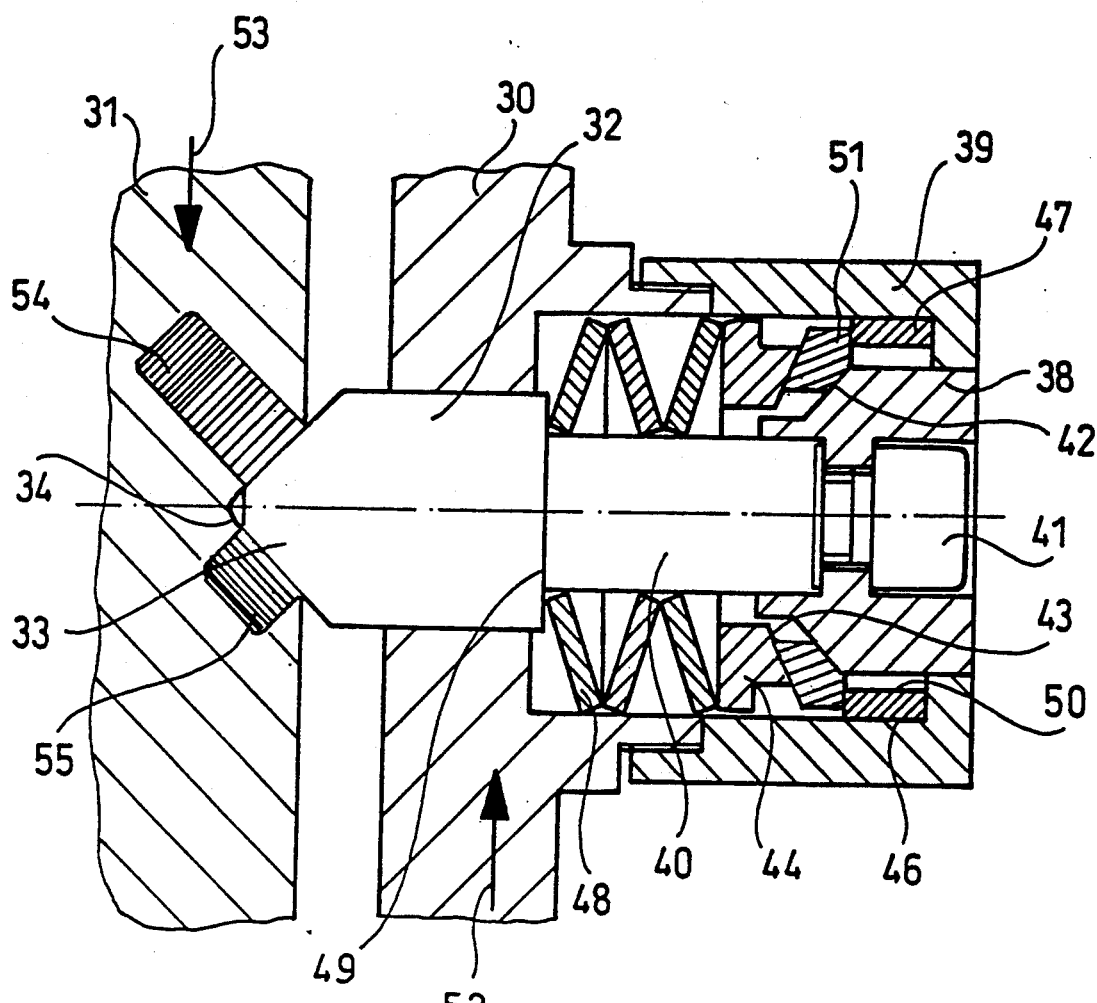
FIGS. 5 to 10 depict a third embodiment of the detent arrangement according to the invention showing details thereof and the conditions developing during the unlocking process.

In FIG. 5 the torque acting between the two clutch halves 30 and 31 is illustrated by arrows 52 and 53. The result of the torque are the contact pressure conditions produced between the pairing of tooth 33 and the sides of tooth gap 34 as shown by faces 54 and 55. This is applicable for normal torque transmission within the clutch.

Figure 7:
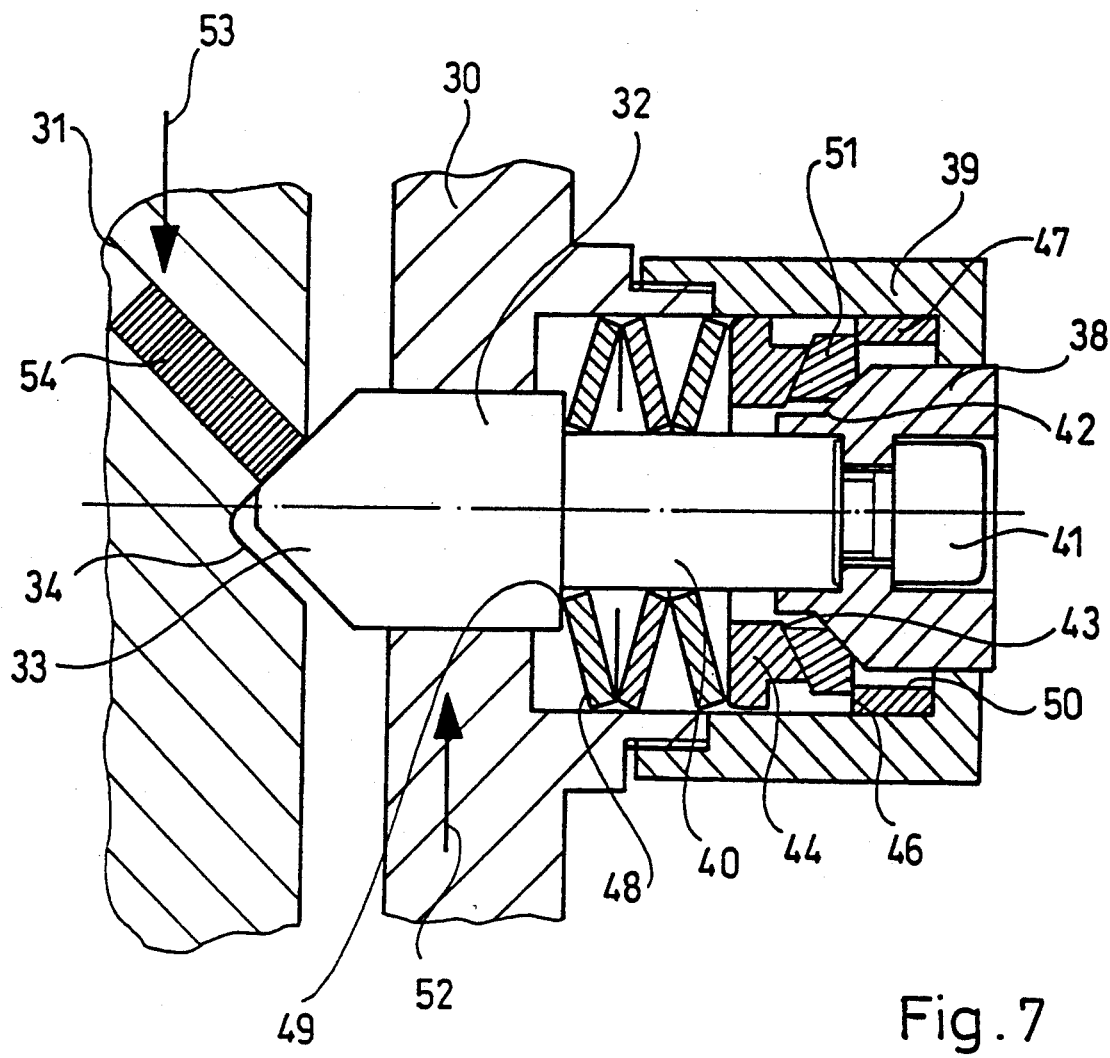

If the case of an overload occurs, conditions become as shown in FIG. 7. Here the load between tooth 33 and the associated side of tooth gap 34 increases in the direction of the torque in such a way that no further load exists on the opposite side; rather, tooth 33 begins to slide out of tooth gap 34 causing a displacement of coupling pin 32 from the left to the right with respect to FIG. 7. Thus cone envelope face 4 is released from ring segments 51 so that the force of spring packet 48 enables the ring segments to be pushed by way of slide ring 44 and its cone envelope face 43 radially inwardly relative to coupling pin 32 along contact face 48 until they are freed from this contact face and are able to slide into the bore 50 formed by ring 47.

Figure 8:
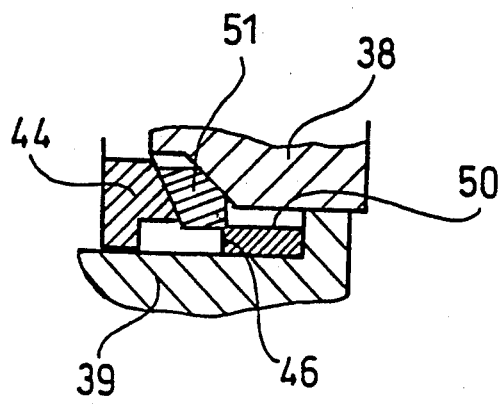
Figure 9:
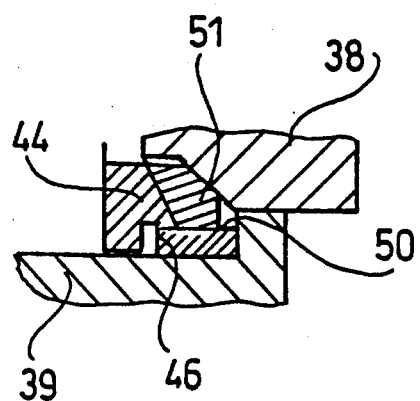

The thus described conditions are shown once more in detail in FIGS. 8 and 9, which are sectional views of FIG. 7 in the region of a ring segment 51. Here FIG. 8 shows the instant at which ring segment 51 is freed from the contact face 48 of ring 47. In continuation, FIG. 9 then shows how thereafter ring segment 51 dips into the bore 50 formed by ring 47.

Figure 10:
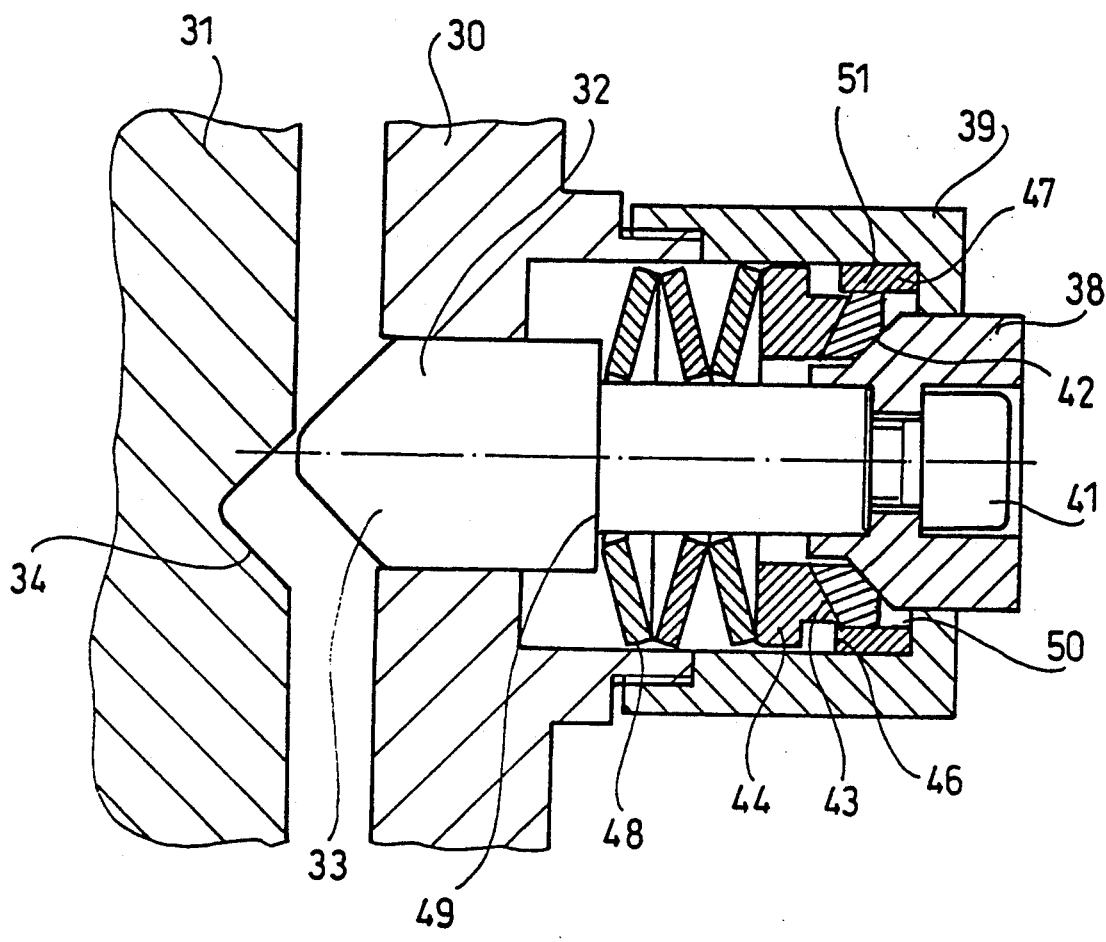

The ultimately resulting disengaged state of the clutch is shown once more as a whole in FIG. 10.

Figure 11:
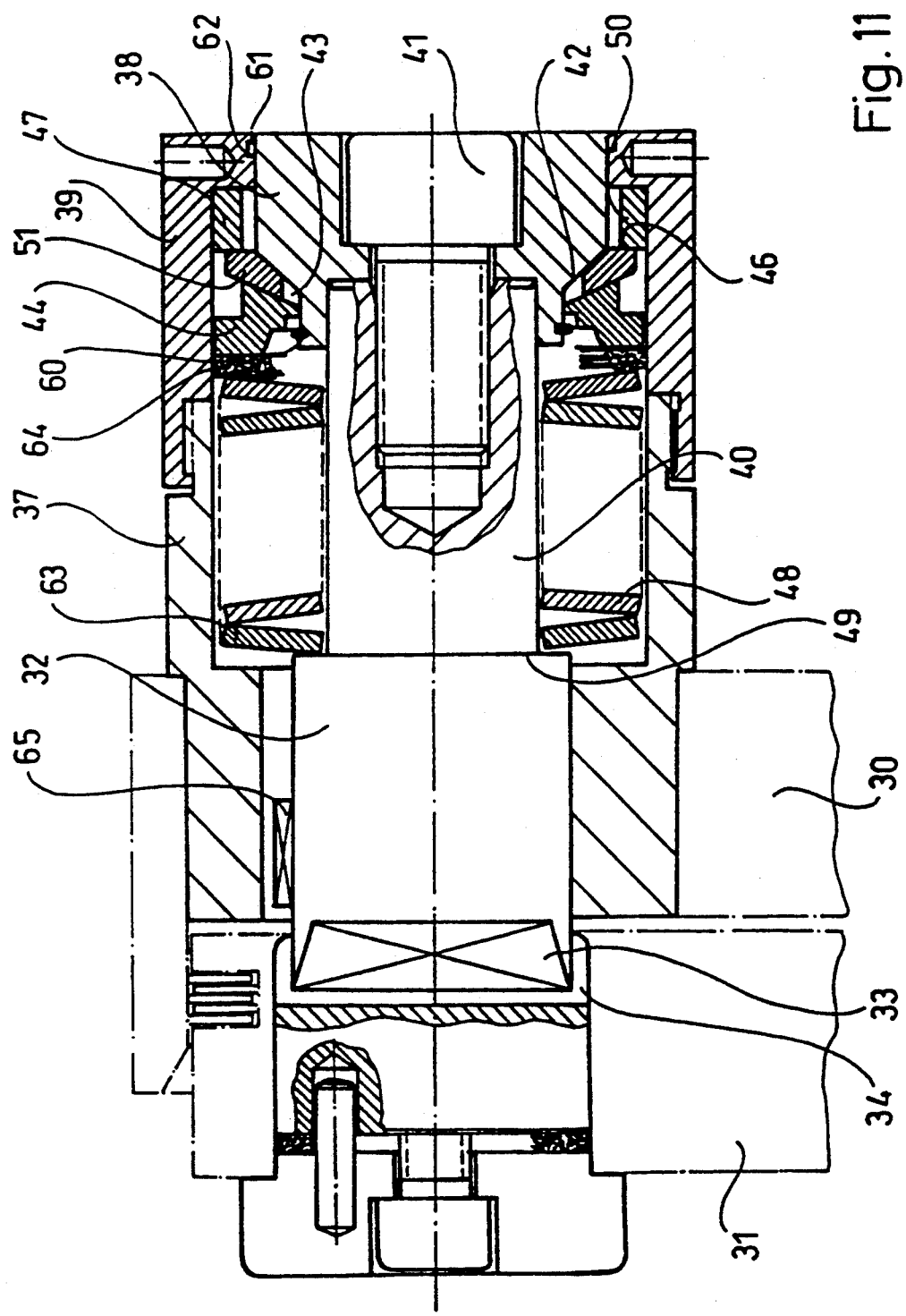
FIG. 11 depicts an embodiment according to FIGS. 5 to 10 supplemented by further details.

FIG. 11 shows further details of the configuration according to FIGS. 5 to 10. While, however, the clutch in FIGS. 5, 7 and 10 is shown viewed in the radial direction, FIG. 11 is a sectional view looking at the clutch in the circumferential direction. Here again the earlier introduced reference numerals are employed correspondingly and a renewed description of the operation of the detent arrangement is therefore not considered to be necessary.

However, different from the subject matter shown in FIGS. 5 to 10 is that the pin cap 38 radially inwardly passes through slide ring 44 and grips behind it by means of a radial web in the form of a spring ring 60 while on the other side, at its end facing away from the other clutch half 31, pin cap 38 is provided with a radial web 61 which is in engagement with a recess 62 on the end of housing member 39, with this recess 62 being provided only at the end of housing member 39 facing away from clutch half 31.

Thus a captive, closed unit results for the group including pin cap 38, ring segments 51, slide ring 44, ring 47 and housing member 39. This unit can be removed as a whole by unscrewing housing member 39 from housing member 37 and loosening screw 41 so that then spring arrangement 48 is exposed and its configuration can be changed. In the present case, for example, the number of disk springs 63 could be changed.

However, it is just as possible to sensitively change the strength of spring arrangement 48 by inserting or removing shims 64 without having to individually dismantle the module that is interconnected in the above described manner and then installing it again.

FIG. 11 also shows that coupling pin 32 is secured against rotation relative to housing member 37 by way of a feather key 65, with feather key 65 possibly having a limited play in the circumferential direction of coupling pin 32 in the manner described in German Patent 3,602,282 (corresponding to U.S. Pat. Nos. 4,798,559 and 4,838,829).

Figure 12:
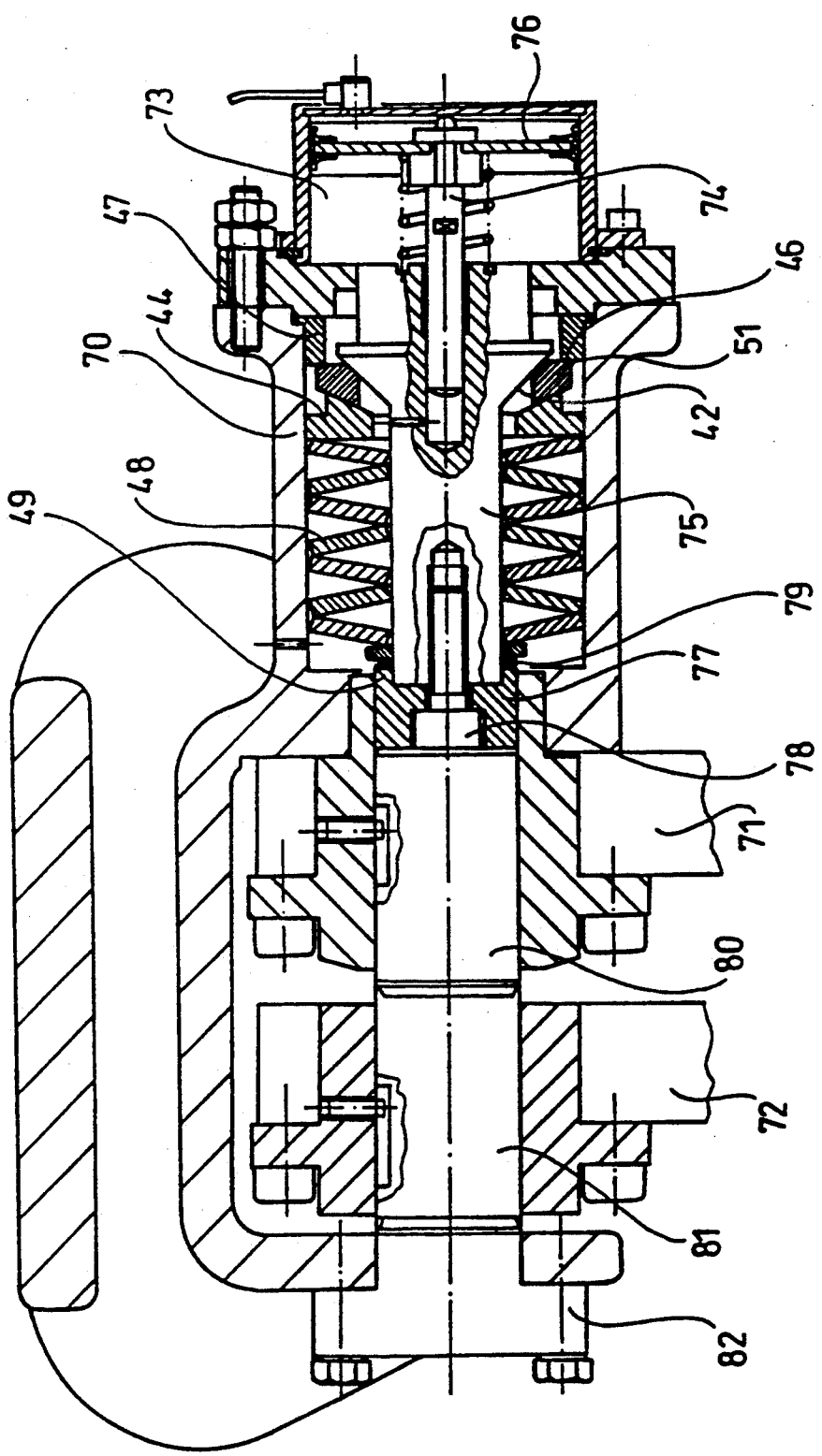
FIG. 12 depicts an embodiment of the detent arrangement according to the invention in conjunction with a double-action overload clutch.

FIG. 12 shows the use of the subject matter of the invention in a clutch configuration according to German Unexamined Published Patent Application DE-OS 3,720,301, with the details of the detent arrangement that have been described already several times, not being repeated again.

As can be seen in FIG. 12, a cylinder-piston assembly 73 is disposed at the housing 70 of the detent arrangement on the side facing away from the second clutch half 72. The piston rod 74 of this cylinder-piston assembly is connected with coupling pin 75 so that it is possible to re-engage the detent element by charging the cylinder-piston assembly with pressure from the right side of piston 76.

On the other hand, the coupling pin is made of several parts in such a way that the pin shaft 75 which accommodates spring arrangement 48 is releasably connected by means of screws 78 or the like with the part 77 of the pin forming the shoulder 49 at its end and facing the other clutch half 72. Thus it is possible to set the force of the spring arrangement by introducing shims 79 into or removing them from the spring arrangement 48 from this side, which is not possible in the manner described in FIG. 11 because of the presence of cylinder-piston assembly 73.

Component 77 is followed by a pin member 80 which is axially displaceably mounted in clutch half 71 and is provided at its front end, for example, with a tooth gap which engages the tooth of an intermediate pin 81 whose other end is provided with a tooth which engages in a tooth gap in side 82 of clutch half 71 where it grips around clutch half 72. With respect to this double action of the clutch, reference is made to DE-OS 3,720,301.

Figure 13:
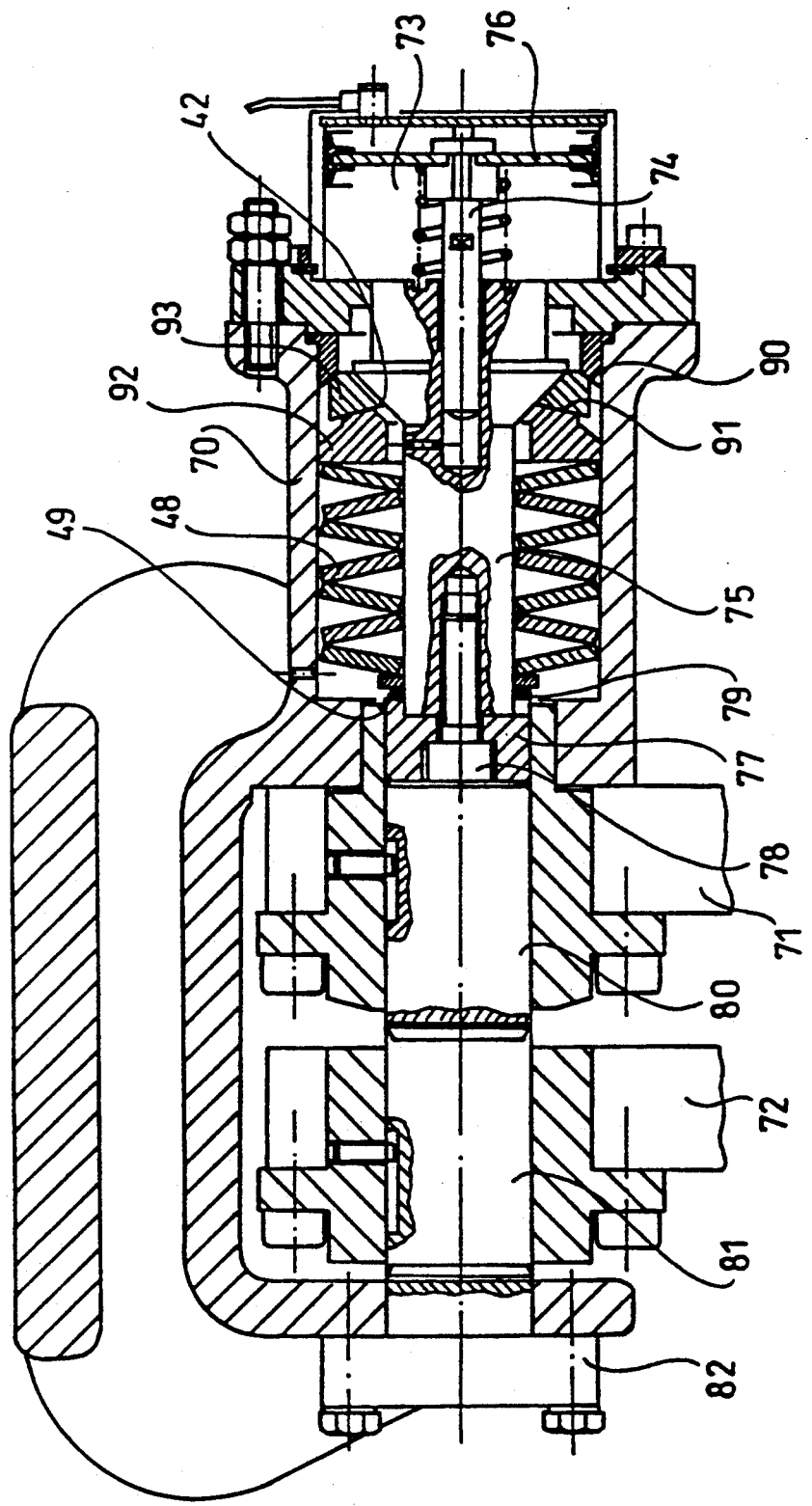
FIG. 13 depicts a modification of the embodiment of the detent arrangement according to the invention shown in FIG. 12.

FIG. 13 shows a modification of the configuration of FIG. 12 which substantially retains the reference numerals of FIG. 12. This modification essentially resides in that now contact face 46 is not arranged radially as in FIG. 12 but is configured as a fluted contact face 90 so that the cone angle is oriented oppositely to the cone angle of cone envelope face 42. Correspondingly, of course, the cone angle of cone envelope face 91 of slide ring 92 must have a slope which is inclined oppositely to the cone envelope face 42 of coupling pin 75 so that the effect described several times above is produced as intended by the present invention.

Figure 14:
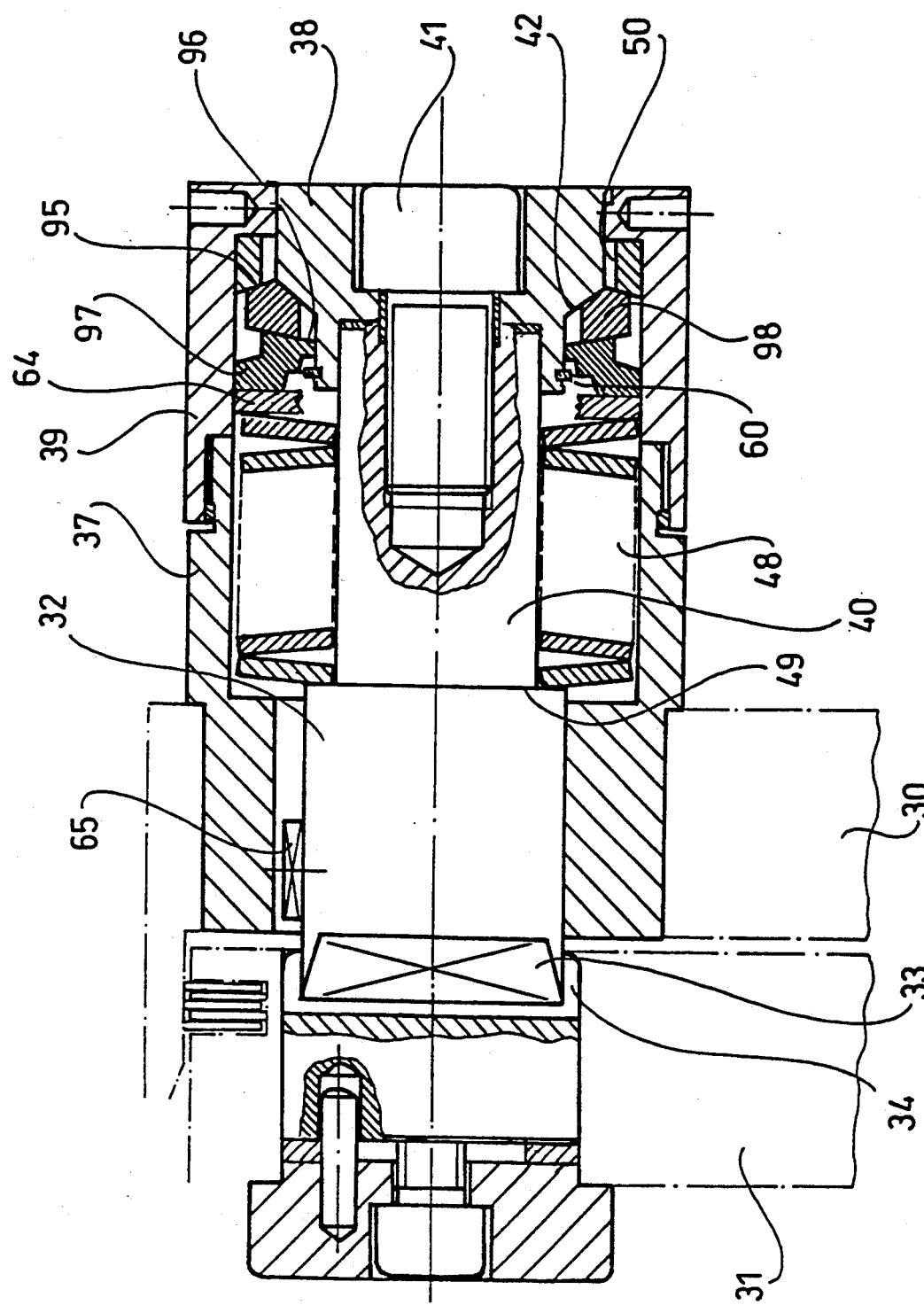
FIG. 14 depicts a modification of the embodiment shown in FIG. 11.

Finally, FIG. 14 shows a modification of the configuration of FIG. 11 with again the reference numerals employed there being continued to a substantial degree.

The difference is that the contact face 46 which is radially oriented in FIG. 11 is now configured as a cone envelope face 95 which is sloped in a direction opposite to the cone envelope face 42 of coupling pin 32. Correspondingly cone envelope face 96 of slide ring 97 may then of course be made steeper with respect to the axis of coupling pin 32 than is the case in the embodiment according to FIG. 11.

In connection with the subject matter of FIGS. 13 and 14 it is understood that the cross sections of locking elements 93 and 98, respectively, are adapted to these changed cone envelope faces.

It will be understood that the above description of the present invention is susceptible to various modifications, changes and adaptations, and the same are intended to be comprehended within the meaning and range of equivalents of the appended claims.

What is claimed is:
1. An overload clutch comprising:
 (a) a first clutch half;
 (b) a second clutch half facing said first clutch half;
 (c) a housing disposed adjacent said first clutch half;
 (d) a coupling pin including a longitudinal axis, a front pin end disposed within said first clutch half and a rear pin end disposed within said housing;
 (d) a detent arrangement having a locked position and an unlocked position, the locked position of said detent arrangement being defined by said front pin end being in form locking engagement with said second clutch half, and the unlocked position of said detent arrangement being defined by said form locking engagement having been released due to an overloading of said clutch, said detent arrangement being configured such that, during an overloading of said clutch, said coupling pin moves along said longitudinal axis and away form said second clutch half for releasing said form locking engagement, said detent arrangement further including a spring arrangement surrounding said rear pin end within said housing, said spring arrangement having a front spring end facing toward said front pin end, and a rear spring face facing toward said rear pin end; wherein said detent arrangement further includes:
  (i) a slide ring disposed within said housing and having a front slide ring face and a rear slide ring face, said front slide ring face being urged against said rear spring face, said slide ring thereby supporting said spring arrangement within said housing at said rear spring face;
  (ii) a radial shoulder disposed on said coupling pin at said front pin end, said radial shoulder being urged against said front spring face for supporting said spring arrangement within said housing at said front spring face;
  (iii) a radially outwardly extending coupling pin cone envelope face disposed on said coupling pin at said rear pin end, said coupling pin cone envelope face being oriented toward said second clutch half;
  (iv) a contact face disposed on said housing and oriented toward said second clutch half; and
  (v) a plurality of locking elements circumferentially distributed about said coupling pin such that, in a locking position of said detent arrangement, said locking elements are captured between said slide ring, said coupling pin cone envelope face, and said contact face, and such that, during an overloading of said clutch, said locking elements are displaced initially toward said longitudinal axis and thereafter generally parallel to said longitudinal axis within a housing bore surrounding said coupling pin and disposed further away from said second clutch half than said contact face.

2. The overload clutch according to claim 1, wherein said contact face is essentially radially oriented.

3. The overload clutch according to claim 1, wherein said contact face comprises a radially inwardly extending housing cone envelope face, said housing cone envelope face being oriented toward said second clutch half, said locking elements being in contact with said rear slide ring face and said housing cone envelope face in a locking position of said detent arrangement.

4. The overload clutch according to claim 3, wherein said rear slide ring face is annular and is radially oriented.

5. The overload clutch according to claim 3, wherein said rear slide ring face comprises a radially outwardly extending slide ring cone envelope face, said slide ring cone envelope face being oriented away from said second clutch half, said slide ring cone envelope face and said coupling pin cone envelope face having a slope relative to one another that is less than a slope of said housing cone envelope face relative to said coupling pin cone envelope face.

6. The overload clutch according to claim 2, wherein said rear slide ring face comprises a radially inwardly extending slide ring cone envelope face, said slide ring cone envelope face being oriented away from said second clutch half, said lockign elements being in contact with said contact face of said housing and said slide ring cone envelope face in a locking position of said coupling pin, said slide ring cone envelope face and said longitudinal axis having a slope relative to one another that is less than a slope of said coupling pin cone envelope face relative to said longitudinal axis.

7. The overload clutch according to claim 1, wherein said contact face comprises a radially inwardly extending housing cone envelope face, said housing cone envelope face being oriented toward said second clutch half, and said rear slide ring face comprises a radially inwardly extending slide ring cone envelope face, said slide ring cone envelope face being oriented away from said second clutch half, said locking elements being in contact with said housing cone envelope face and said slide ring cone envelope face in a locking position of said dent arrangement.

8. The overload clutch according to claim 1, wherein said locking elements are balls.

9. The overload clutch according to claim 1, wherein said locking elements are ring segments having a polygonal cross section, said ring segments being circumferentially distributed about said coupling pin and further including lateral, pressure receiving faces extending parallel to corresponding, contacting faces of said slide ring, said coupling pin, and said housing.

10. The overload clutch according to claim 1, wherein said housing includes means for attachment to said first clutch half by screws.

11. The overload clutch according to claim 1, wherein said coupling pin cone envelope face is formed by a pin cap affixed to said rear pin end by way of screws.

12. The overload clutch according to claim 11, wherein said pin cap is accommodated in a pin cap bore included at a rear side of said housing, said pin cap gripping behind said slide ring by means of a releasable first radial web configured as a spring ring, said pin cap further being provided, at its end facing away from said second clutch half, a second radial web, said second radial web being in engagement with a recess at said rear side of said housing, said recess widening said pin cap bore.

13. The overload clutch according to claim 1, wherein said contact face of said housing is formed by a supporting ring inserted into said housing.

14. The overload clutch according to claim 1, wherein shims are inserted between said slide ring and said spring arrangement.

15. The overload clutch according to claim 1, wherein shims are inserted between said spring arrangement and said radial shoulder of said coupling pin.

16. The overload clutch according to claim 1, wherein said coupling pin is formed of a first part and a second part, said first part comprising said rear pin end and accommodating said spring arrangement, said second part comprising said front pin end and including said radial shoulder, said first part being releasably connected to said second part.

17. The overload clutch according to claim 16, wherein said first part is releasably connected to said second part by screws.

* * * * *